United States Patent
Han et al.

(10) Patent No.: US 6,451,484 B1
(45) Date of Patent: Sep. 17, 2002

(54) LITHIUM SECONDARY BATTERY AND MANUFACTURING METHOD THEREOF

(75) Inventors: Se-jong Han; Ki-ho Kim; Yun-seok Choi; Jin-soo Lee; Yong-Beom Lee, all of Cheonan; Hyung-gon Noh, Seoul, all of (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/553,284

(22) Filed: Apr. 20, 2000

(30) Foreign Application Priority Data

Apr. 21, 1999 (KR) .............................................. 99-14263
Apr. 21, 1999 (KR) .............................................. 99-14267

(51) Int. Cl.$^7$ ............................................... H01M 2/00
(52) U.S. Cl. ................... 429/231.95; 429/127; 429/135; 429/162; 29/623.4
(58) Field of Search ................................ 429/303, 135, 429/217, 162, 163, 127, 231.95; 29/623.4

(56) References Cited

U.S. PATENT DOCUMENTS

| | | | | |
|---|---|---|---|---|
| 5,558,957 A | * | 9/1996 | Datta et al. ................ 29/623.4 |
| 5,682,592 A | * | 10/1997 | Yun et al. ..................... 419/65 |
| 5,716,421 A | * | 2/1998 | Pendalwar et al. ......... 29/623.3 |
| 5,741,609 A | * | 4/1998 | Chen et al. .................. 429/192 |
| 5,962,162 A | * | 10/1999 | Barrella et al. ............. 429/162 |
| 6,051,342 A | * | 4/2000 | Hamano et al. ............ 429/303 |
| 6,287,720 B1 | * | 9/2001 | Yamashita et al. ......... 29/623.5 |

* cited by examiner

Primary Examiner—Carol Chaney
(74) Attorney, Agent, or Firm—Leydig, Voit & Mayer, Ltd.

(57) ABSTRACT

A lithium secondary battery and a method of manufacturing the battery. In the lithium secondary battery including a positive electrode plate having a positive electrode current collector and a positive electrode sheet having a positive electrode active material fixed to at least one surface of the positive electrode current collector, a negative electrode plate having a negative electrode current collector and a negative electrode sheet having a negative electrode active material fixed to at least one surface of the negative electrode current collector, a separator is interposed between the positive electrode plate and the negative electrode plate, and a coating of a polymer material having a high elongation ratio is present on at least each one outer surface of the positive and negative electrode plates to improve battery safety.

10 Claims, 3 Drawing Sheets

LITHIUM SECONDARY BATTERY AND MANUFACTURING METHOD THEREOF

BACKGROUND OF THE INVENTION

1. Field of the Invention

The present invention relates to a secondary battery, and more particularly, to a lithium secondary battery having an improved structure to attain an excellent safety, and a manufacturing method thereof.

2. Description of the Related Art

Lithium batteries are classified into liquid electrolyte batteries and polymer electrolyte batteries according to the type of electrolyte used. Generally, batteries using liquid electrolyte are called lithium ion batteries and batteries using polymer electrolyte are called a lithium polymer batteries.

Lithium secondary batteries are fabricated in various shapes. Typically, cylindrical or prismatic batteries are fabricated as lithium-ion batteries. Lithium polymer secondary batteries have flexibility so that they are relatively free in view of shape design. Accordingly, lithium polymer secondary batteries having excellent safety and freedom in shape design and light in weight are advantageous in attaining miniaturized and light-weight portable electronic apparatuses, and research into the lithium polymer secondary battery is being carried out in various manners.

FIG. 1 is a partially enlarged cross-sectional view of a battery unit 10 in a conventional lithium secondary battery.

Referring to FIG. 1, the battery unit 10 includes a positive electrode plate 11, a separator 13 and a negative electrode plate 12 laminated in sequence.

The positive electrode plate 11 includes a positive electrode current collector 14 having a plurality of openings 14a. The positive electrode current collector 14 is a thin film of aluminum. A front positive electrode sheet 15 and a rear positive electrode sheet 16 are present on both surfaces of the positive electrode current collector 14. The positive electrode sheets 15 and 16 have positive electrode active materials such as lithium oxide as main components and have a binder, a conductive material and a plasticizer as auxiliary components.

The negative electrode plate 12 includes a negative electrode current collector 17, like the positive electrode plate 11. The negative electrode current collector 17 has a plurality of openings 17a and is a thin film of copper. A front negative electrode sheet 18 and a rear negative electrode sheet 19 are fixed to both surfaces of the negative electrode current collector 17. The negative electrode sheets 18 and 19 have negative electrode active materials such as carbon materials as main components and have a binder, a conductive material and a plasticizer as auxiliary components.

The positive electrode plate 11, the separator 13 and the negative electrode plate 12 are fused by applying heat and pressure through a laminating process. The plasticizer is extracted from the positive and negative electrode plates 11 and 12 and an electrolyte is impregnated into a space produced by extracting the plasticizer.

The lithium secondary battery having the above-described battery unit 10 encounters with several problems.

In other words, a lithium ion battery generally uses lithium-based oxide for a positive electrode, carbon-based oxide for a negative electrode and an organic solvent for an electrolyte. Thus, if the battery is overcharged, the electrolyte is decomposed at the positive electrode and lithium metal is precipitated in the negative electrode, thereby deteriorating the battery characteristics. Also, the battery may generate heat or ignition.

A lithium polymer battery is also locally overheated during charging and discharging. Accordingly, a polymer electrolyte which is thermally weak is locally dissolved or softened. Thus, the distribution of electrical potentials is not uniform, which results in short-circuiting.

Thus, in the lithium polymer battery, it is most important to achieve battery safety. To this end, lithium polymer batteries undergo various types of safety tests. Among them, a piercing test is performed in preparation for the event that severe internal short-circuiting may be caused by an external force. If internal short-circuiting occurs, energy is instantaneously concentrated on the spot where the short-circuiting occurs. Then, the battery experiences thermal runaway due to heat and other side reactions. Various researches into methods of removing the dangers of the battery are being carried out.

SUMMARY OF THE INVENTION

To solve the above problems, it is an object of the present invention to provide a lithium secondary battery by which internal short-circuiting is prevented by forming a coating layer having an excellent elongation ratio on at least one surface of positive and negative electrode plates to thus improve a battery safety, and a manufacturing method thereof.

Accordingly, to achieve the above object, there is provided a lithium secondary battery including a positive electrode plate having a positive electrode current collector and a positive electrode sheet having a positive electrode active material fixed to at least one surface of the positive electrode current collector as a main component, a negative electrode plate having a negative electrode current collector and a negative electrode sheet having a negative electrode active material fixed to at least one surface of the negative electrode current collector, and a separator interposed between the positive electrode plate and the negative electrode plate, wherein a coating layer made of a polymer material having a high elongation ratio is formed on at least each one outer surface of the positive and negative electrode plates.

Also, the coating layer is a polymer material selected from the group consisting of polyvinylidene fluoride (PVDF), polyvinylidene fluoride-hexafluoro propylene (PVDF-HFP), polyvinyl chloride homo-polymer (PVC homo-polymer), polyvinyl chloride co-polymer (PVC co-polymer), styrene-butadiene rubber (SBR), polyacrylonitrile (PAN) and poly (methyl methacrylate) (PMMA).

Further, the coating layer preferably consists of 3 to 30% by weight of a coating solution. Also, the coating layer preferably has a thickness of 1 to 10 micrometers and an elongation ratio of 200% or higher.

According to another aspect of the present invention, there is provided a method for manufacturing a lithium secondary battery including the steps of providing a positive electrode current collector and a negative electrode current collector, fixing a positive electrode sheet and a negative electrode sheet to at least each one surface of the positive and negative electrode current collectors and primarily rolling the same to form a positive electrode plate and a negative electrode plate, forming a coating layer made of polymer having a high elongation ratio on at least each one surface of the positive and negative electrode plates, immersing the positive and negative electrode plates having the coating layer in a separately provided solvent and producing a space where an electrolyte is impregnated, drying the positive and negative electrode plates and secondarily rolling the same to have a predetermined thickness, and interposing a separator between the positive electrode plate and the negative electrode plate and thirdly rolling the same.

In the step of forming a coating layer, preferably, a polymer material selected from the group consisting of polyvinylidene fluoride (PVDF), polyvinylidene fluoride-hexafluoro propylene (PVDF-HFP), polyvinyl chloride homo-polymer (PVC homo-polymer), polyvinyl chloride co-polymer (PVC co-polymer), styrene-butadiene rubber (SBR), polyacrylonitrile (PAN) and poly(methyl methaceylate) (PMMA), is coated.

Also, in the step of forming a coating layer, the polymer contained in the coating layer is preferably 3 to 30% by weight. Further, in the step of forming a coating layer, a solvent selected from the group consisting of acetone and N-methyl pyrrolidone (NMP) may be used for dissolving the polymer.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

A preferred embodiment of the present invention will now be described in detail with reference to the accompanying drawings.

Figure 2:
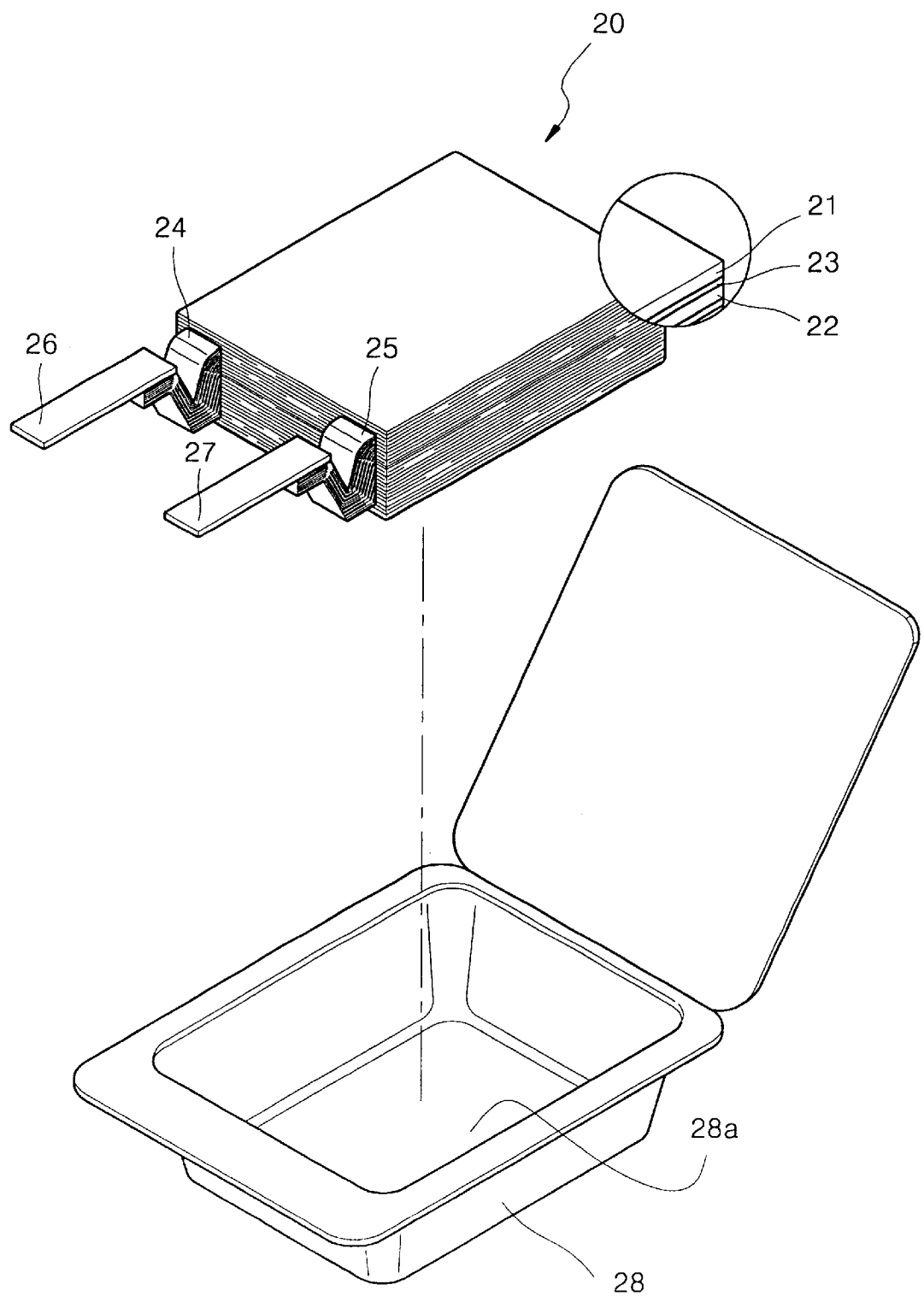
FIG. 2 is an exploded perspective view schematically illustrating a lithium secondary battery according to the present invention.

FIG. 2 illustrates a lithium secondary battery 20 according to the present invention.

Referring to FIG. 2, the battery 20 includes a battery unit having a positive electrode plate 21, a separator 23 and a negative electrode plate 22 laminated sequentially. A plurality of positive electrode taps 24 are drawn out from one side of the positive electrode plate 21 and a plurality of negative electrode taps 25 are drawn out from one side of the negative electrode plate 22. The plurality of positive and negative electrode taps 24 and 25 are bent in a V-shape, respectively. Ends of the positive and negative electrode taps are welded to a positive electrode terminal 26 and a negative electrode terminal 27, respectively.

The battery unit is accommodated in a case 28 having a space 28a. Here, the positive and negative electrode terminals 26 and 27 protrude outside the case 28 and are sealed over a predetermined length.

A predetermined coating layer having a high elongation ratio is on at least one surface of the positive and negative electrode plates 21 and 22, which will be described later.

Figure 3:
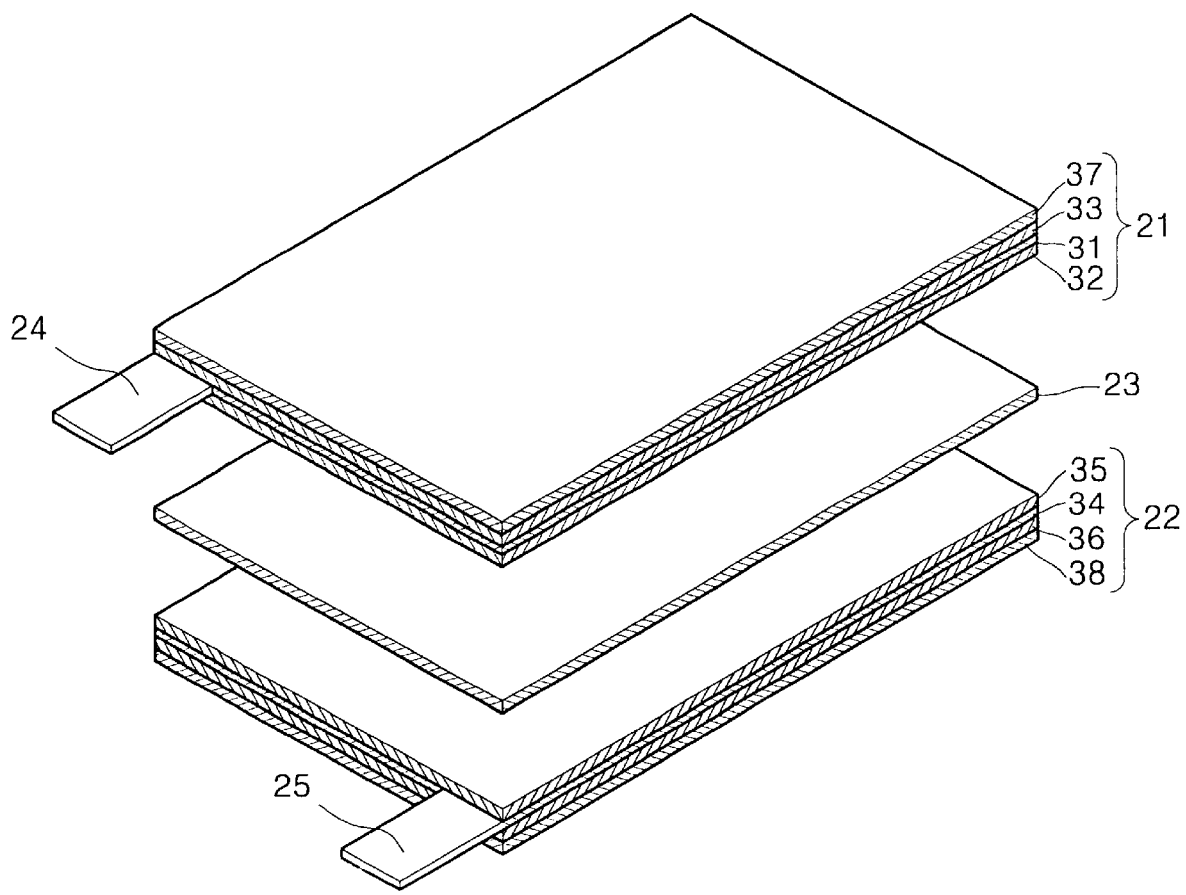
FIG. 3 is a perspective view illustrating a battery unit shown in FIG. 2.

As shown in FIG. 3, the positive electrode plate 21 includes a positive electrode current collector 31, and a front positive electrode sheet 32 and a rear positive electrode sheet 33 which are fixed to both surfaces of the positive electrode current collector 31. The positive electrode current collector 31 is a thin film of aluminum. The front and rear positive electrode sheets 32 and 33 have positive electrode active materials such as lithium oxide as main components and have a binder, a conductive material and a plasticizer as auxiliary components.

The negative electrode plate 22 includes a negative electrode current collector 34, and a front negative electrode sheet 35 and a rear negative electrode sheet 36 which are fixed to both surfaces of the negative electrode current collector 34. The front and rear negative electrode sheets 35 and 36 have negative electrode active materials, preferably carbon materials, as main components and have a binder, a conductive material and a plasticizer as auxiliary components.

The separator 23 is interposed between the positive electrode plate 21 and the negative electrode plate 22.

Here, coatings are located on outer surfaces of the positive electrode plate 21 and the negative electrode plate 22. In this case, the coatings may be variably formed, for example, on one side of the positive and negative electrode plates 21 and 22 or on both sides thereof.

In this embodiment, a first coating 37 is present on an outer surface of the rear positive electrode sheet 33 and a second coating 38 is present on an outer surface of the rear negative electrode sheet 36.

Here, the first and second 37 and 38 are preferably a material having an excellent elongation ratio in order to prevent piercing due to a nail which penetrates the battery unit during a piercing test.

The first and second coatings 37 and 38 mainly consist of a polymer material selected from the group consisting of polyvinylidene fluoride (PVDF), polyvinylidene fluoride-hexafluoro propylene (PVDF-HFP), polyvinyl chloride homo-polymer (PVC homo-polymer), polyvinyl chloride co-polymer (PVC co-polymer), styrene-butadiene rubber (SBR), polyacrylonitrile (PAN) and poly(methyl methacrylate) (PMMA).

The battery having the aforementioned configuration is manufactured as follows.

In the following embodiments, PVDF-HFP or PVC materials are employed as the first and second coatings 37 and 38. However, the battery according to the present invention is not limited to the specific details and various modifications can be made without departing from the spirit or scope of the invention.

EXAMPLE 1

A positive electrode current collector 31 and a negative electrode current collector 34 were provided. Positive electrode sheets 32 and 33 and negative electrode sheets 35 and 36 were placed on both surfaces of the positive and negative electrode current collectors 31 and 34, and then primary rolling was performed in a laminating process.

After the primary rolling was completed, first and second coatings 37 and 38 were formed on both surfaces of the positive and negative electrode current collectors 31 and 34.

Here, PVDF/HFP was used as the first and second coatings 37 and 38.

In other words, 10 g of PVDF/HFP was added to 100 ml of acetone and the mixture was sufficiently stirred for dissolution. Then, acetone was evaporated to prepare a slurry having a predetermined viscosity.

Next, the slurry was uniformly applied to both surfaces of the positive and negative electrode sheets 33 and 36 using a doctor blade. The thicknesses of the first and second coating layers 37 and 38 are preferably 15 $\mu$m.

After the coating was completed, positive and negative electrode plates 21 and 22 were dipped into distilled water for a predetermined time, for example, about 1 minute, so that the plasticizer was extracted from a space where the electrolyte would be impregnated.

Subsequently, the positive and negative electrode plates 21 and 22 were vacuum-dried for 24 hours at a temperature of about 70° C.

Next, the positive and negative electrode plates 21 and 22 were secondarily rolled to have each desired thickness. Then, the positive and negative electrode plates 21 and 22 were rolled a third time with the separator 23 interposed therebetween, thereby completing the battery unit.

EXAMPLE 2

A positive electrode current collector 31 and a negative electrode current collector 34 were provided. Then, positive electrode sheets 32 and 33, negative electrode sheets 35 and 36 and first and second coating layers 37 and 38 were formed, as in Example 1. Here, PVC was used as first and second coatings 37 and 38.

In other words, 10 g of PVC was added to 100 ml of N-Methyl-2-Pyrrolidone (NMP) and the mixture was sufficiently stirred for dissolution. A slurry was prepared from the solution, and then the slurry was uniformly applied to both surfaces of the positive and negative electrode sheets 33 and 36 using a doctor blade. The thicknesses of the first and second coatings 37 and 38 were about 15 $\mu$m.

Then, positive and negative electrode plates 21 and 22 were dipped into distilled water for a predetermined time, for example, about 1 minute, so that the plasticizer was extracted from the space where the electrolyte would be impregnated.

Subsequently, the positive and negative electrode plates 21 and 22 were vacuum-dried for 24 hours at a temperature of about 70° C.

Next, the same procedure as in the Example 1 was carried out.

EXAMPLE 3

As in the Examples 1 and 2, first and second coatings 37 and 38 were formed on outer surfaces of a positive electrode sheet 33 and a negative electrode sheet 36, respectively.

Here, PVDF/HFP was used as the first and second coatings 37 and 38.

In other words, 10 g of PVDF/HFP was added to 100 ml of acetone and the mixture was sufficiently stirred for dissolution. Then, acetone was evaporated to prepare a slurry.

Next, the first and second coatings 37 and 38 were uniformly applied to outer surfaces of the positive and negative electrode sheets 33 and 36. The thicknesses of the first and second coatings 37 and 38 are preferably 15 $\mu$m.

Subsequently, positive and negative electrode plates 21 and 22 were dipped into tetrahydofuran (THF) for about 1 minute, to produce a space where the electrolyte would be impregnated. Then, the positive and negative electrode plates 21 and 22 were vacuum-dried for 24 hours at a temperature of about 70° C.

Next, the same procedure as in the Example 1 or 2 was carried out.

EXAMPLE 4

As in the Examples 1, 2 and 3, first and second coatings 37 and 38 were formed on outer surfaces of a positive electrode sheet 33 and a negative electrode sheet 36, respectively.

Here, PVC was used as the first and second coatings 37 and 38.

In other words, 10 g of PVC was added to 100 ml of NMP and the mixture was sufficiently stirred for dissolution. Then, the first and second coating layers 37 and 38 were uniformly applied to outer surfaces of the positive and negative electrode sheets 33 and 36. The thicknesses of the first and second coatings 37 and 38 are preferably 5 $\mu$m.

Subsequently, positive and negative electrode plates 21 and 22 were dipped into ethyl alcohol for about 1 minute, to produce a space where the electrolyte would be impregnated. Then, the positive and negative electrode plates 21 and 22 were vacuum-dried for 24 hours at a temperature of about 70° C.

Next, the same procedure as in the Example 1, 2 or 3 was carried out.

Comparative Example 1

Figure 1:
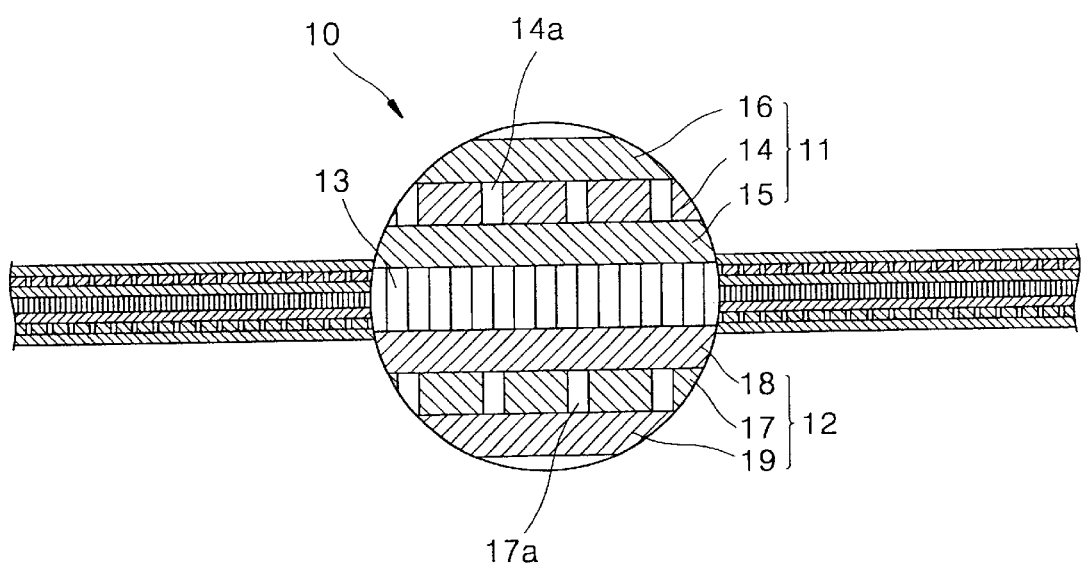
FIG. 1 is a partially enlarged cross-sectional view partially schematically illustrating a battery unit of a conventional lithium secondary battery.

As shown in FIG. 1, a positive electrode plate 11 and a negative electrode plate 12 were provided. The positive electrode plate 11 has front and rear positive electrode sheets 15 and 16 fixedly attached to opposite surfaces of a positive electrode current collector 14. The negative electrode plate 12 has front and rear negative electrode sheets 18 and 19 fixedly attached to opposite surfaces of a negative electrode current collector 17. The positive electrode plate 11 and the negative electrode plate 12 according to Comparative example 1 were made of the same materials as those of the positive electrode plate 21 and the negative electrode plate 22 according to Examples 1 through 4.

Next, the positive electrode plate 11 and the negative electrode plate 12 were rolled with a separator 13 interposed therebetween. Subsequently, a plasticizer was extracted from the positive electrode plate 11 and the negative electrode plate 12, and then an electrolyte was impregnated into the space from which the plasticizer was extracted, thereby completing a battery unit.

First and second coatings 37 and 38 according to various embodiments of the present invention have an ion conductivity of $10^{-6}$ S/cm and an elongation ratio of 200% or higher. Also, the first and second coatings 37 and 38 preferably have 3 to 30% by weight of polymer.

The following Table 1 shows the result of a piercing test according to an embodiment of the present invention.

TABLE 1

| No. | OCV (V) | Leakage | Flash | Flame | Smoke | Ignition | Explosion |
|-----|---------|---------|-------|-------|-------|----------|-----------|
| 1   | 4.043   | ○       | x     | x     | x     | x        | x         |
| 2   | 4.064   | ○       | x     | x     | x     | x        | x         |
| 3   | 4.050   | ○       | x     | x     | x     | x        | x         |
| 4   | 4.047   | ○       | x     | x     | x     | x        | x         |

(○: Generated; x: Not generated)

The result shown in Table 1 was obtained by performing a piercing test on a battery completed by preparing a coating having a concentration of 5 wt %, on the outer surface of an electrode plate, and rolling the coated electrode plate to a predetermined thickness.

As shown in Table 1, none of four samples exhibited flash, flame, smoke, ignition and explosion, and leakage occurred to all samples, implying that the battery had excellent performance.

The following Table 2 shows the result of a piercing test according to another embodiment of the present invention.

TABLE 2

| No. | OCV (V) | Leakage | Flash | Flame | Smoke | Ignition | Explosion |
|---|---|---|---|---|---|---|---|
| 1 | 3.946 | o | x | x | x | x | x |
| 2 | 3.830 | o | x | x | x | x | x |
| 3 | 3.985 | o | x | x | x | x | x |
| 4 | 4.040 | o | x | x | x | x | x |

(o: Generated; x: Not generated)

The result shown in Table 2 was obtained by performing a piercing test on a battery completed by preparing a coating layer having a concentration of 10 wt %, coating the same on the outer surface of an electrode plate, rolling the coated electrode plate to a predetermined thickness.

As shown in Table 2, none of four samples exhibited flash, flame, smoke, ignition and explosion, and leakage occurred to all samples, implying that the battery had excellent performance.

As described above, the first and second coatings 37 and 38 coat at least one surface of each of the positive and negative electrode plates 21 and 22. Accordingly, when a piercing test, which is one kind of safety test, is performed, nails are pushed into a battery unit without puncture by elongation of the first and second coatings 37 and 38, which precludes contact with the positive and negative electrode plates 21 and 22, thereby preventing internal short-circuiting and flash, flame, smoke, ignition, explosion and the like.

As described above, according to the lithium secondary battery and the method for manufacturing the same, the safety of a battery can be enhanced by forming coatings of a polymer on outer surfaces of electrode plates.

While the present invention has been described with respect to what is presently considered to be the preferred embodiment, it is to be understood that the disclosed embodiment is provided only for an exemplary embodiment. To the contrary, the present invention is intended to cover various modifications and equivalent arrangements included within the spirit and scope of the appended claims. Accordingly, the true scope and spirit of the invention will be indicated by the following claims.

What is claimed is:

1. A lithium secondary battery comprising:
    a positive electrode including
        a positive electrode current collector having first and second sides, and
        a positive electrode sheet including a positive electrode active material fixed to the first side of the positive electrode current collector;
    a negative electrode including
        a negative electrode current collector having first and second sides, and
        a negative electrode sheet including a negative electrode active material fixed to the first side of the negative electrode current collector;
    a separator interposed between the positive electrode and the negative electrode, proximate the first sides of the positive and the negative electrodes; and
    a coating of a polymer on the second sides of each of the positive and negative electrodes, remote from the separator, the coating having an elongation ratio of at least 200%.

2. The lithium secondary battery according to claim 1, wherein the polymer is selected from the group consisting of polyvinylidene fluoride, polyvinylidene fluoride-hexafluoro propylene, polyvinyl chloride homo-polymer, polyvinyl chloride co-polymer, styrene-butadiene rubber, polyacrylonitrile, and poly(methyl methacrylate).

3. The lithium secondary battery according to claim 1, wherein the coating has a thickness of 1 to 10 micrometers.

4. A method for manufacturing a lithium secondary battery comprising:
    providing a positive electrode current collector having first and second sides and a negative electrode current collector having first and second sides;
    fixing a positive electrode sheet to the first side of the positive electrode current collector and fixing a negative electrode sheet to the first side of the negative electrode current collector and respectively rolling the positive electrode current collector with the positive electrode sheet and the negative electrode current collective with the negative electrode sheet to form a positive electrode and a negative electrode;
    forming coatings of a polymer at the second sides of the positive and negative electrode current collectors;
    immersing the positive and negative electrodes having the respective coatings separately in a solvent to produce interstitial spaces in which an electrolyte is to be disposed;
    drying the positive and negative electrodes and respectively rolling the positive and negative electrodes to have a thickness; and
    interposing a separator between the positive electrode and the negative electrode, proximate the first sides of the positive electrode current collector and the negative electrode current collector, and rolling the positive electrode, the separator, and the negative electrode together.

5. The method according to claim 4, wherein the polymer is selected from the group consisting of polyvinylidene fluoride, polyvinylidene fluoride-hexafluoro propylene, polyvinyl chloride homo-polymer, polyvinyl chloride co-polymer, styrene-butadiene rubber, polyacrylonitrile, and poly(methyl methacrylate).

6. The method according to claim 4, wherein, in forming the coatings, applying a solution to the second sides of the positive and negative electrode current collectors, the solution including the polymer as 3 to 30%, by weight, of the solution.

7. The method according to claim 6, including, before forming the coatings, dissolving the polymer in a solvent selected from the group consisting of acetone and N-methyl pyrrolidone.

8. A lithium secondary battery comprising:
    a positive electrode including
        a positive electrode current collector having first and second sides, and
        first and second positive electrode sheets including a positive electrode active material respectively fixed to the first and second sides of the positive electrode current collector;
    a negative electrode including
        a negative electrode current collector having first and second sides, and
        first and second negative electrode sheets including a negative electrode active material respectively fixed to the first and second sides of the negative electrode current collector;

a separator interposed between the positive electrode and the negative electrode, proximate the first sides of the positive and the negative electrodes; and coatings of a polymer on each of the second positive and negative electrode sheets, remote from the separator, each of the coatings having an elongation ratio of at least 200%.

9. The lithium secondary battery according to claim 8, wherein the polymer is selected from the group consisting of polyvinylidene fluoride, polyvinylidene fluoride-hexafluoro propylene, polyvinyl chloride homo-polymer, polyvinyl chloride co-polymer, styrene-butadiene rubber, polyacrylonitrile, and poly(methyl methacrylate).

10. The lithium secondary battery according to claim 8, wherein each of the coatings has a thickness of 1 to 10 micrometers.

* * * * *